(12) United States Patent
Mismar et al.

(10) Patent No.: US 12,463,713 B2
(45) Date of Patent: Nov. 4, 2025

(54) APPARATUS, METHOD, AND COMPUTER PROGRAM

(71) Applicant: Nokia Solutions and Networks Oy, Espoo (FI)

(72) Inventors: Faris Mismar, Plano, TX (US); Aliye Kaya, Chatham, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/630,126

(22) Filed: Apr. 9, 2024

(65) Prior Publication Data

US 2024/0348326 A1 Oct. 17, 2024

(30) Foreign Application Priority Data

Apr. 14, 2023 (FI) ...................................... 20235424

(51) Int. Cl.
*H04B 7/185* (2006.01)
*H04B 7/195* (2006.01)

(52) U.S. Cl.
CPC ......... *H04B 7/18513* (2013.01); *H04B 7/195* (2013.01)

(58) Field of Classification Search
CPC ............................ H04B 7/18513; H04B 7/195
See application file for complete search history.

(56) References Cited

U.S. PATENT DOCUMENTS

| | | | |
|---|---|---|---|
| 11,563,484 B2 | 1/2023 | Wang et al. | |
| 2002/0146979 A1* | 10/2002 | Regulinski | H04B 7/18513 455/430 |
| 2018/0241464 A1 | 8/2018 | Michaels | |
| 2018/0254825 A1* | 9/2018 | Speidel | H04B 7/18582 |
| 2021/0250885 A1* | 8/2021 | Medles | H04L 27/0014 |
| 2022/0007322 A1* | 1/2022 | Marshall | H04B 7/18504 |
| 2022/0038139 A1* | 2/2022 | Eriksson Löwenmark | H04B 7/01 |
| 2022/0159544 A1* | 5/2022 | Gupta | H04W 40/06 |

(Continued)

OTHER PUBLICATIONS

Moderator (NTT Docomo, Inc.), "Summary #1 on 9.12.1 Coverage enhancement for NR NTN," 3GPP TSG RAN WG1 #109-e. R1-2205210, May 9-20, 2022.

*Primary Examiner* — Steven S Kelley
(74) *Attorney, Agent, or Firm* — McCarter & English LLP

(57) ABSTRACT

There is provided a method, computer program and apparatus for causing an apparatus to perform: determining that a first non-terrestrial apparatus coverage area provided by a non-terrestrial apparatus will at least partially overlap with a first access coverage area provided by a terrestrial access network node at and/or during a first time; determining a first Doppler shift correction value, the first Doppler shift correction value corresponding to a frequency shift resulting from a relative velocity difference between the non-terrestrial apparatus and the terrestrial access network node at and/or during the first time; determining at least one first shifted non-terrestrial apparatus frequency by correcting at least one transmission and/or reception frequency of the non-terrestrial apparatus using the first Doppler shift correction value; and causing the terrestrial access network node to abstain from transmitting and/or receiving signalling on resources corresponding to the at least one first shifted non-terrestrial apparatus frequency.

12 Claims, 8 Drawing Sheets

(56) References Cited

U.S. PATENT DOCUMENTS

| | | | |
|---|---|---|---|
| 2023/0109635 A1* | 4/2023 | Palermo | H04B 7/18521 455/13.1 |
| 2023/0188200 A1* | 6/2023 | Anchala | H04B 7/18519 370/316 |
| 2024/0080224 A1* | 3/2024 | Sun | H04B 7/18513 |
| 2024/0340692 A1* | 10/2024 | Ozozlu | H04W 28/0284 |
| 2024/0388360 A1* | 11/2024 | Lauridsen | H04B 7/18563 |

* cited by examiner

APPARATUS, METHOD, AND COMPUTER PROGRAM

FIELD OF THE DISCLOSURE

The examples described herein generally relate to apparatus, methods, and computer programs, and more particularly (but not exclusively) to apparatus, methods and computer programs for apparatuses.

BACKGROUND

A communication system can be seen as a facility that enables communication sessions between two or more entities such as communication devices, base stations and/or other nodes by providing carriers between the various entities involved in the communications path.

The communication system may be a wireless communication system. Examples of wireless systems comprise public land mobile networks (PLMN) operating based on radio standards such as those provided by 3GPP, satellite based communication systems and different wireless networks. The wireless systems can typically be divided into cells, and are therefore often referred to as cellular systems.

The communication system and associated devices typically operate in accordance with a given standard or specification which sets out what the various entities associated with the system are permitted to do and how that should be achieved. Communication protocols and/or parameters which shall be used for the connection are also typically defined. Examples of standard are the so-called 5G standards.

SUMMARY

According to a first aspect, there is provided an apparatus comprising means for: determining that a first non-terrestrial apparatus coverage area provided by a non-terrestrial apparatus will at least partially overlap with a first access coverage area provided by a terrestrial access network node at and/or during a first time; determining a first Doppler shift correction value, the first Doppler shift correction value corresponding to a frequency shift resulting from a relative velocity difference between the non-terrestrial apparatus and the terrestrial access network node at and/or during the first time; determining at least one first shifted non-terrestrial apparatus frequency by correcting at least one transmission and/or reception frequency of the non-terrestrial apparatus using the first Doppler shift correction value; and causing the terrestrial access network node to abstain from transmitting and/or receiving signalling on resources corresponding to the at least one first shifted non-terrestrial apparatus frequency.

The means for causing may comprise means for: causing the terrestrial access network node to abstain from receiving said signalling by causing a user equipment located within the first access coverage area to abstain from transmitting at the at least one first shifted non-terrestrial apparatus frequency.

The means for causing may comprise means for: causing the terrestrial access network node to abstain from transmitting signalling on resources corresponding to the at least one first shifted non-terrestrial apparatus frequency.

The apparatus may further comprise means for: determining that a second non-terrestrial apparatus coverage area provided by the non-terrestrial apparatus will at least partially overlap with a second access coverage area provided by the terrestrial access network node at and/or during a second time; determining a second Doppler shift correction value, the second Doppler shift correction value corresponding to a frequency shift resulting from a relative velocity difference between the non-terrestrial apparatus and the terrestrial access network node at and/or during the second time; determining at least one second shifted non-terrestrial apparatus frequency by correcting at least one transmission and/or reception frequency of the non-terrestrial apparatus using the second Doppler shift correction value; and causing the terrestrial access network node to abstain from transmitting and/or receiving signalling on resources corresponding to the at least one second shifted non-terrestrial apparatus frequency.

The least one first shifted non-terrestrial apparatus frequency may be different to the at least one first shifted non-terrestrial apparatus frequency, and the apparatus may comprise means for, at or during the second time, causing the terrestrial access network node to transmit and/or receive signalling on resources corresponding to the at least one first shifted non-terrestrial apparatus frequency.

The apparatus may further comprise means for: determining that a third non-terrestrial apparatus coverage area provided by the non-terrestrial apparatus will not at least partially overlap with a third access coverage area provided by the terrestrial access network node at and/or during a third time; and causing the terrestrial access network node to transmit and/or receive signalling on resources corresponding to the at least one second shifted non-terrestrial apparatus frequency.

The apparatus may further comprise means for: obtaining at least one of: a current location of the non-terrestrial apparatus, a trajectory of the non-terrestrial apparatus, a speed and/or velocity of the non-terrestrial apparatus, or the transmission and/or reception frequency of the non-terrestrial apparatus.

The obtaining may comprise obtaining from a publicly available database.

The resources may be physical resource blocks.

The apparatus may be at least one of: the terrestrial access network node, another terrestrial access network node, the non-terrestrial apparatus, a user equipment, or a server.

The non-terrestrial apparatus may be a non-geostationary satellite.

The non-terrestrial apparatus may be a low Earth orbit satellite.

According to a second aspect, there is provided an apparatus comprising: at least one processor; and at least one memory comprising code that, when executed by the at least one processor, causes the apparatus to perform: determining that a first non-terrestrial apparatus coverage area provided by a non-terrestrial apparatus will at least partially overlap with a first access coverage area provided by a terrestrial access network node at and/or during a first time; determining a first Doppler shift correction value, the first Doppler shift correction value corresponding to a frequency shift resulting from a relative velocity difference between the non-terrestrial apparatus and the terrestrial access network node at and/or during the first time; determining at least one first shifted non-terrestrial apparatus frequency by correcting at least one transmission and/or reception frequency of the non-terrestrial apparatus using the first Doppler shift correction value; and causing the terrestrial access network node to abstain from transmitting and/or receiving signalling on resources corresponding to the at least one first shifted non-terrestrial apparatus frequency.

The causing may comprise: causing the terrestrial access network node to abstain from receiving said signalling by causing a user equipment located within the first access coverage area to abstain from transmitting at the at least one first shifted non-terrestrial apparatus frequency.

The causing may comprise: causing the terrestrial access network node to abstain from transmitting signalling on resources corresponding to the at least one first shifted non-terrestrial apparatus frquency.

The apparatus may further be caused to perform: determining that a second non-terrestrial apparatus coverage area provided by the non-terrestrial apparatus will at least partially overlap with a second access coverage area provided by the terrestrial access network node at and/or during a second time; determining a second Doppler shift correction value, the second Doppler shift correction value corresponding to a frequency shift resulting from a relative velocity difference between the non-terrestrial apparatus and the terrestrial access network node at and/or during the second time; determining at least one second shifted non-terrestrial apparatus frequency by correcting at least one transmission and/or reception frequency of the non-terrestrial apparatus using the second Doppler shift correction value; and causing the terrestrial access network node to abstain from transmitting and/or receiving signalling on resources corresponding to the at least one second shifted non-terrestrial apparatus frequency.

The least one first shifted non-terrestrial apparatus frequency may be different to the at least one first shifted non-terrestrial apparatus frequency, and the apparatus may be further caused to perform, at or during the second time, causing the terrestrial access network node to transmit and/or receive signalling on resources corresponding to the at least one first shifted non-terrestrial apparatus frequency.

The apparatus may further be caused to perform: determining that a third non-terrestrial apparatus coverage area provided by the non-terrestrial apparatus will not at least partially overlap with a third access coverage area provided by the terrestrial access network node at and/or during a third time; and causing the terrestrial access network node to transmit and/or receive signalling on resources corresponding to the at least one second shifted non-terrestrial apparatus frequency.

The apparatus may further be caused to perform: obtaining at least one of: a current location of the non-terrestrial apparatus, a trajectory of the non-terrestrial apparatus, a speed and/or velocity of the non-terrestrial apparatus, or the transmission and/or reception frequency of the non-terrestrial apparatus.

The obtaining may comprise obtaining from a publicly available database.

The resources may be physical resource blocks.

The apparatus may be at least one of: the terrestrial access network node, another terrestrial access network node, the non-terrestrial apparatus, a user equipment, or a server.

The non-terrestrial apparatus may be a non-geostationary satellite.

The non-terrestrial apparatus may be a low Earth orbit satellite.

According to a third aspect, there is provided a method for an apparatus, the method comprising: determining that a first non-terrestrial apparatus coverage area provided by a non-terrestrial apparatus will at least partially overlap with a first access coverage area provided by a terrestrial access network node at and/or during a first time; determining a first Doppler shift correction value, the first Doppler shift correction value corresponding to a frequency shift resulting from a relative velocity difference between the non-terrestrial apparatus and the terrestrial access network node at and/or during the first time; determining at least one first shifted non-terrestrial apparatus frequency by correcting at least one transmission and/or reception frequency of the non-terrestrial apparatus using the first Doppler shift correction value; and causing the terrestrial access network node to abstain from transmitting and/or receiving signalling on resources corresponding to the at least one first shifted non-terrestrial apparatus frequency.

The causing may comprise: causing the terrestrial access network node to abstain from receiving said signalling by causing a user equipment located within the first access coverage area to abstain from transmitting at the at least one first shifted non-terrestrial apparatus frequency.

The causing may comprise: causing the terrestrial access network node to abstain from transmitting signalling on resources corresponding to the at least one first shifted non-terrestrial apparatus frequency.

The method may further comprise: determining that a second non-terrestrial apparatus coverage area provided by the non-terrestrial apparatus will at least partially overlap with a second access coverage area provided by the terrestrial access network node at and/or during a second time; determining a second Doppler shift correction value, the second Doppler shift correction value corresponding to a frequency shift resulting from a relative velocity difference between the non-terrestrial apparatus and the terrestrial access network node at and/or during the second time; determining at least one second shifted non-terrestrial apparatus frequency by correcting at least one transmission and/or reception frequency of the non-terrestrial apparatus using the second Doppler shift correction value; and causing the terrestrial access network node to abstain from transmitting and/or receiving signalling on resources corresponding to the at least one second shifted non-terrestrial apparatus frequency.

The least one first shifted non-terrestrial apparatus frequency may be different to the at least one first shifted non-terrestrial apparatus frequency, and the method may further comprise, at or during the second time, causing the terrestrial access network node to transmit and/or receive signalling on resources corresponding to the at least one first shifted non-terrestrial apparatus frequency.

The method may further comprise: determining that a third non-terrestrial apparatus coverage area provided by the non-terrestrial apparatus will not at least partially overlap with a third access coverage area provided by the terrestrial access network node at and/or during a third time; and causing the terrestrial access network node to transmit and/or receive signalling on resources corresponding to the at least one second shifted non-terrestrial apparatus frequency.

The method may further comprise: obtaining at least one of: a current location of the non-terrestrial apparatus, a trajectory of the non-terrestrial apparatus, a speed and/or velocity of the non-terrestrial apparatus, or the transmission and/or reception frequency of the non-terrestrial apparatus.

The obtaining may comprise obtaining from a publicly available database.

The resources may be physical resource blocks.

The apparatus may be at least one of: the terrestrial access network node, another terrestrial access network node, the non-terrestrial apparatus, a user equipment, or a server.

The non-terrestrial apparatus may be a non-geostationary satellite.

The non-terrestrial apparatus may be a low Earth orbit satellite.

According to a fourth aspect, there is provided an apparatus comprising: determining circuitry for determining that a first non-terrestrial apparatus coverage area provided by a non-terrestrial apparatus will at least partially overlap with a first access coverage area provided by a terrestrial access network node at and/or during a first time; determining circuitry for determining a first Doppler shift correction value, the first Doppler shift correction value corresponding to a frequency shift resulting from a relative velocity difference between the non-terrestrial apparatus and the terrestrial access network node at and/or during the first time; determining circuitry for determining at least one first shifted non-terrestrial apparatus frequency by correcting at least one transmission and/or reception frequency of the non-terrestrial apparatus using the first Doppler shift correction value; and causing circuitry for causing the terrestrial access network node to abstain from transmitting and/or receiving signalling on resources corresponding to the at least one first shifted non-terrestrial apparatus frequency.

The causing circuitry for causing may comprise: causing circuitry for causing the terrestrial access network node to abstain from receiving said signalling by causing a user equipment located within the first access coverage area to abstain from transmitting at the at least one first shifted non-terrestrial apparatus frequency.

The causing circuitry for causing may comprise: causing circuitry for causing the terrestrial access network node to abstain from transmitting signalling on resources corresponding to the at least one first shifted non-terrestrial apparatus frequency.

The apparatus may further comprise: determining circuitry for determining that a second non-terrestrial apparatus coverage area provided by the non-terrestrial apparatus will at least partially overlap with a second access coverage area provided by the terrestrial access network node at and/or during a second time; determining circuitry for determining a second Doppler shift correction value, the second Doppler shift correction value corresponding to a frequency shift resulting from a relative velocity difference between the non-terrestrial apparatus and the terrestrial access network node at and/or during the second time; determining circuitry for determining at least one second shifted non-terrestrial apparatus frequency by correcting at least one transmission and/or reception frequency of the non-terrestrial apparatus using the second Doppler shift correction value; and causing circuitry for causing the terrestrial access network node to abstain from transmitting and/or receiving signalling on resources corresponding to the at least one second shifted non-terrestrial apparatus frequency.

The least one first shifted non-terrestrial apparatus frequency may be different to the at least one first shifted non-terrestrial apparatus frequency, and the apparatus may comprise causing circuitry for, at or during the second time, causing the terrestrial access network node to transmit and/or receive signalling on resources corresponding to the at least one first shifted non-terrestrial apparatus frequency.

The apparatus may further comprise: determining circuitry for determining that a third non-terrestrial apparatus coverage area provided by the non-terrestrial apparatus will not at least partially overlap with a third access coverage area provided by the terrestrial access network node at and/or during a third time; and causing circuitry for causing the terrestrial access network node to transmit and/or receive signalling on resources corresponding to the at least one second shifted non-terrestrial apparatus frequency.

The apparatus may further comprise: obtaining circuitry for obtaining at least one of: a current location of the non-terrestrial apparatus, a trajectory of the non-terrestrial apparatus, a speed and/or velocity of the non-terrestrial apparatus, or the transmission and/or reception frequency of the non-terrestrial apparatus.

The obtaining may comprise obtaining from a publicly available database.

The resources may be physical resource blocks.

The apparatus may be at least one of: the terrestrial access network node, another terrestrial access network node, the non-terrestrial apparatus, a user equipment, or a server.

The non-terrestrial apparatus may be a non-geostationary satellite.

The non-terrestrial apparatus may be a low Earth orbit satellite.

According to a fifth aspect, there is provided non-transitory computer readable medium comprising program instructions for causing an apparatus to perform: determining that a first non-terrestrial apparatus coverage area provided by a non-terrestrial apparatus will at least partially overlap with a first access coverage area provided by a terrestrial access network node at and/or during a first time; determining a first Doppler shift correction value, the first Doppler shift correction value corresponding to a frequency shift resulting from a relative velocity difference between the non-terrestrial apparatus and the terrestrial access network node at and/or during the first time; determining at least one first shifted non-terrestrial apparatus frequency by correcting at least one transmission and/or reception frequency of the non-terrestrial apparatus using the first Doppler shift correction value; and causing the terrestrial access network node to abstain from transmitting and/or receiving signalling on resources corresponding to the at least one first shifted non-terrestrial apparatus frequency.

The causing may comprise: causing the terrestrial access network node to abstain from receiving said signalling by causing a user equipment located within the first access coverage area to abstain from transmitting at the at least one first shifted non-terrestrial apparatus frequency.

The causing may comprise: causing the terrestrial access network node to abstain from transmitting signalling on resources corresponding to the at least one first shifted non-terrestrial apparatus frquency.

The apparatus may further be caused to perform: determining that a second non-terrestrial apparatus coverage area provided by the non-terrestrial apparatus will at least partially overlap with a second access coverage area provided by the terrestrial access network node at and/or during a second time; determining a second Doppler shift correction value, the second Doppler shift correction value corresponding to a frequency shift resulting from a relative velocity difference between the non-terrestrial apparatus and the terrestrial access network node at and/or during the second time; determining at least one second shifted non-terrestrial apparatus frequency by correcting at least one transmission and/or reception frequency of the non-terrestrial apparatus using the second Doppler shift correction value; and causing the terrestrial access network node to abstain from transmitting and/or receiving signalling on resources corresponding to the at least one second shifted non-terrestrial apparatus frequency.

The least one first shifted non-terrestrial apparatus frequency may be different to the at least one first shifted non-terrestrial apparatus frequency, and the apparatus may be further caused to perform, at or during the second time, causing the terrestrial access network node to transmit and/or receive signalling on resources corresponding to the at least one first shifted non-terrestrial apparatus frequency.

The apparatus may further be caused to perform: determining that a third non-terrestrial apparatus coverage area provided by the non-terrestrial apparatus will not at least partially overlap with a third access coverage area provided by the terrestrial access network node at and/or during a third time; and causing the terrestrial access network node to transmit and/or receive signalling on resources corresponding to the at least one second shifted non-terrestrial apparatus frequency.

The apparatus may further be caused to perform: obtaining at least one of: a current location of the non-terrestrial apparatus, a trajectory of the non-terrestrial apparatus, a speed and/or velocity of the non-terrestrial apparatus, or the transmission and/or reception frequency of the non-terrestrial apparatus.

The obtaining may comprise obtaining from a publicly available database.

The resources may be physical resource blocks.

The apparatus may be at least one of: the terrestrial access network node, another terrestrial access network node, the non-terrestrial apparatus, a user equipment, or a server.

The non-terrestrial apparatus may be a non-geostationary satellite.

The non-terrestrial apparatus may be a low Earth orbit satellite.

According to a sixth aspect, there is provided a computer program product stored on a medium that may cause an apparatus to perform any method as described herein.

According to a seventh aspect, there is provided an electronic device that may comprise apparatus as described herein.

According to an eighth aspect, there is provided a chipset that may comprise an apparatus as described herein.

BRIEF DESCRIPTION OF FIGURES

Some examples, will now be described, merely by way of illustration only, with reference to the accompanying drawings in which.

DETAILED DESCRIPTION

The following describes operations that may be performed for enabling a terrestrial transmitting and/or receiving apparatus and a transmitting and/or receiving non-terrestrial apparatus (e.g., a satellite and/or high altitude platform station) to more efficiently co-share a same frequency spectrum. The non-terrestrial apparatus may be associated with a higher preference (e.g., priority) for using the frequency band than the terrestrial transmitting and/or receiving apparatus. It is understood that, for brevity, the following uses references to satellites to also include references to other forms of non-terrestrial apparatuses, such as high altitude platform stations (which may be considered a form of pseudo satellite). A satellite may comprise an apparatus placed in an orbit around a body (e.g., the Earth).

In particular, the following discloses an apparatus that uses a Doppler correction factor when estimating a frequency of a non-geostationary satellite to obtain a frequency at a terrestrial transmitter and/or receiver that has the possibility of interfering with signals transmitted and/or received by the non-geostationary satellite. The frequency is mapped to at least one physical resource block allocated for use by the terrestrial transmitter and/or receiver. The mapped at least one physical resource block is then blocked for transmission and/or reception by the terrestrial transmitter and/or receiver until it is determined that the associated frequency no longer has the possibility of interfering with signals transmitted and/or received by the non-geostationary satellite. This may be, for example, as a result of the non-geostationary satellite moving towards and/or away from terrestrial transmitter and/or receiver, with the Doppler correction factor being updated based on the relative movement between the non-geostationary satellite and the terrestrial transmitter and/or receiver.

It is understood that the following may use the terms "satellite", "non-geostationary satellite", and "low earth orbit satellite" interchangeably. These terms are intended to cover those satellites who move relative to a terrestrial base station.

In the following description of examples, certain aspects are explained with reference to devices that are often capable of communication via a wireless cellular system and mobile communication systems serving such mobile communication devices. For brevity and clarity, the following describes such aspects with reference to a 5G wireless communication system. However, it is understood that such aspects are not limited to 5G wireless communication systems, and may, for example, be applied to other wireless communication systems (for example, enhanced pre- and future-5G systems, current 6G proposals, IEEE 802.11, etc.).

Before describing in detail the examples, certain general principles of a 5G wireless communication system are briefly explained with reference to FIGS. 1 to 3.

Figure 1:
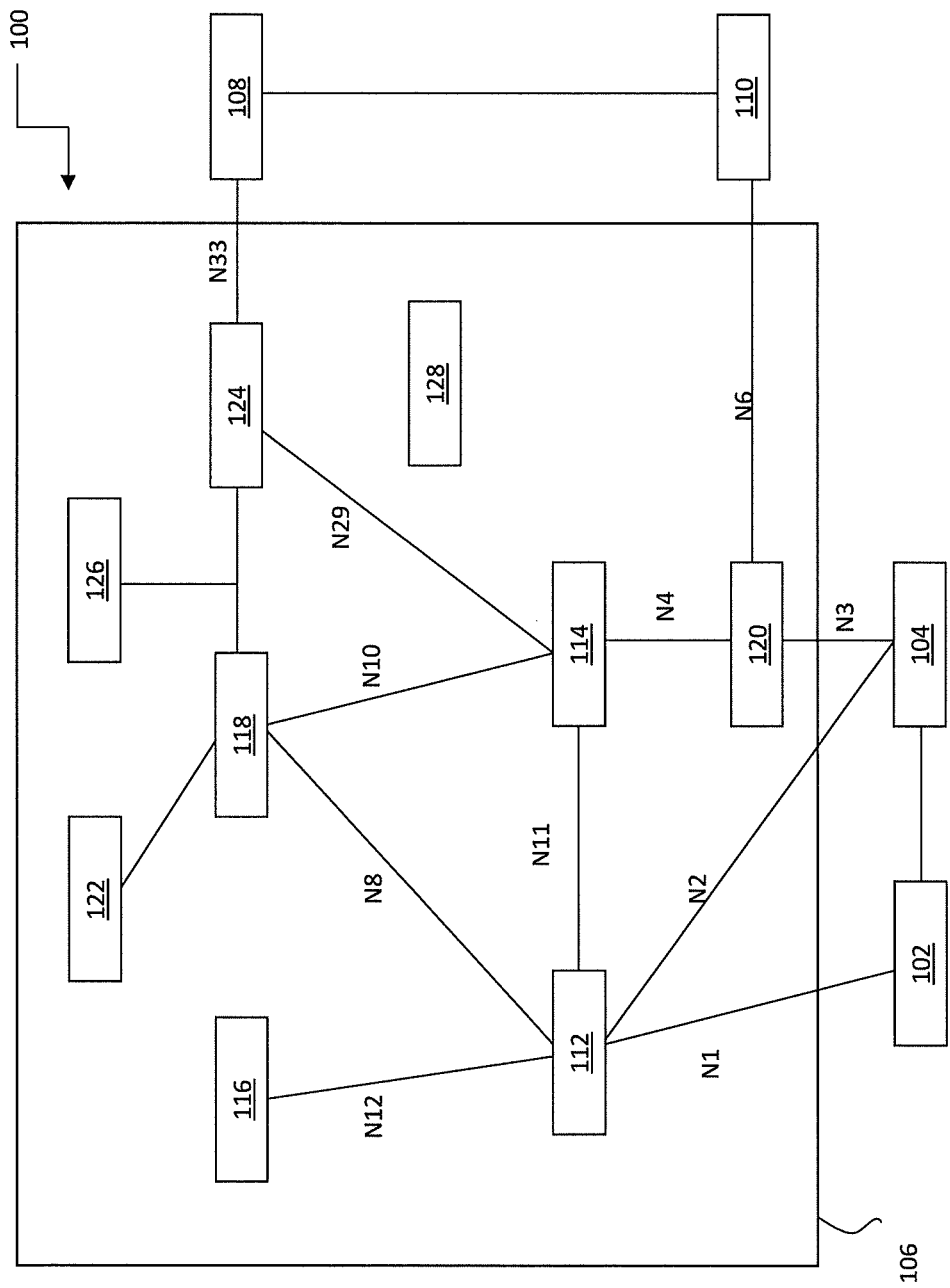
FIG. 1 shows a schematic representation of a 5G system.

FIG. 1 shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

Figure 2:
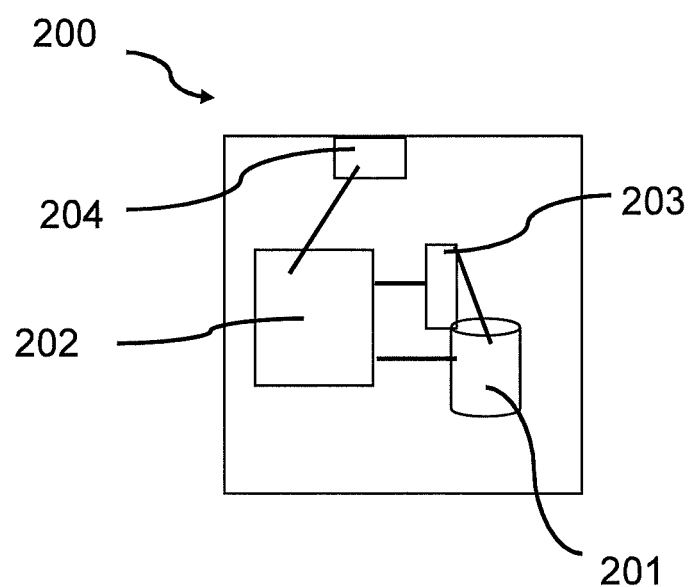
FIG. 2 shows a schematic representation of a network apparatus.

FIG. 2 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NRF, NWDAF, AMF, SMF, UDM/UDR, and so forth. The control apparatus may be integrated with or external to a node or module of a core network or RAN. In some examples, base stations comprise a separate control apparatus unit or module. In other examples, the control apparatus can be another network element, such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example, the control apparatus 200 or processor 201 can be configured to execute an appropriate software code to provide the control functions. References to "code" herein are understood to refer to software code, and vice versa.

The station of the access system may be categorised into two different types: distributed units (DUs), and centralised units (CUs).

A DU provides access node support for lower layers of the protocol stack (such as, for example, the radio link control (RLC), medium access control (MAC), and/or physical layer protocol layers). Each DU is able to support one or more cells, while each cell is able to support one or more beams.

A CU can support multiple DUs, and provides access node support for higher layers of the protocol stack within an access node (such as, for example, packet data convergence protocol (PDCP), service data adaptation protocol (SDAP), and/or radio resource control (RRC) protocol layers). The interface between a CU and a DU is labelled as an F1 interface. There is a single CU for each gNB, and CU's belonging to multiple gNB may be implemented using a shared hardware platform.

Figure 3:
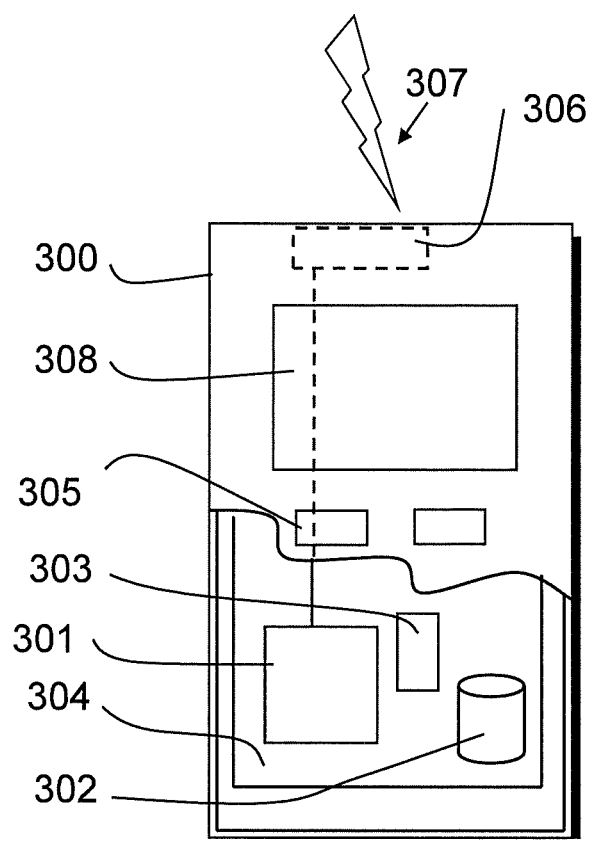
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is referred to as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. As described herein, the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3, a transceiver apparatus is designated schematically by block 306. The transceiver apparatus 306 may be provided, for example, by means of a radio part and associated antenna arrangement. The antenna arrangement may be arranged internally or externally to the wireless device.

A wireless device is typically provided with at least one data processing entity 301, at least one memory 302 and other possible components 303 for use in software code and hardware aided execution of Tasks it is designed to perform, including control of access to and communications with access systems and other communication devices. The data processing, storage and other relevant control apparatus can be provided on an appropriate circuit board and/or in chipsets. This feature is denoted by reference 304. The user may control the operation of the wireless device by means of a suitable user interface such as keypad 305, voice commands, touch sensitive screen or pad, combinations thereof or the like. A display 308, a speaker and a microphone can be also provided. Furthermore, a wireless communication device may comprise appropriate connectors (either wired or wireless) to other devices and/or for connecting external accessories, for example hands-free equipment, thereto.

Figure 4:
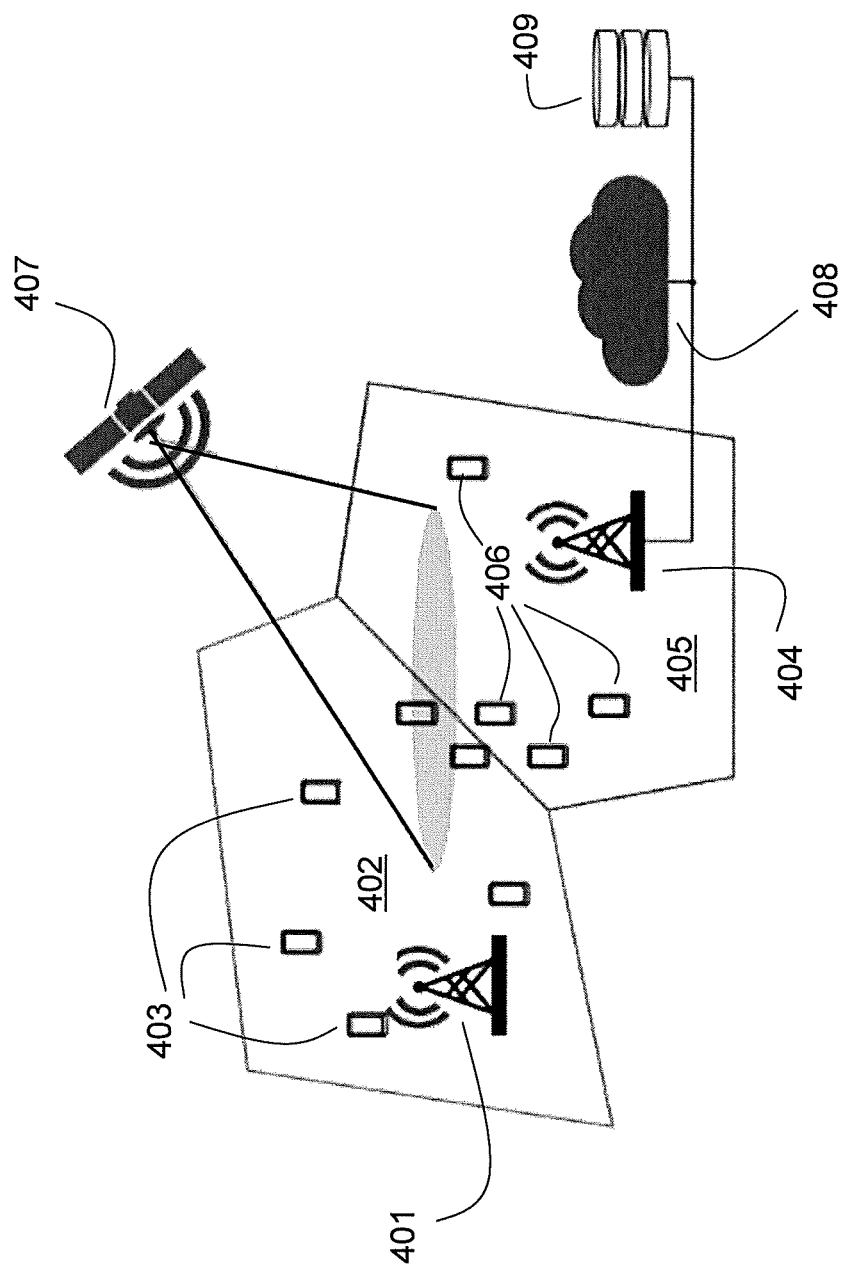
FIG. 4 illustrates an example network.

FIG. 4 illustrates an example access network. FIG. 4 shows a first access network node 401 providing a first cell 402 that comprises a plurality of UEs 403. There is also shown a second access network node 404 providing a second cell 405 that comprises a plurality of UEs 406. The first access network node 401 is illustrated signalling upstream via a satellite 407. The second access network node is illustrated signalling upstream via any of the satellite 407, and an edge cloud 408 to a database 409. Communications between an access network node and its respective plurality of UEs may be performed used Physical Resource Blocks (PRBs), which are a specific number of frequency subcarriers that have been allocated to a UE for uplink and/or downlink signalling by their respective access network node. A PRB may be considered to be a smallest non-overlapping element of resource allocation assigned by the access network node scheduler over a finite timeslot duration.

Satellites, and in particular low Earth orbit (LEO) satellites, possess wide-area coverage with significantly reduced latency due to lower altitude orbits (e.g., compared to geosynchronous satellites). However, due to that low orbit, the velocity of these satellites is very high, which may cause each LEO satellite to make several Earth turns per day.

Therefore, even if a terrestrial access network node is granted access to transmit at a frequency that belongs to the satellite frequency range, the terrestrial access network node has a short period of time to transmit at that frequency in order to avoid interfering with any satellite transmissions. Although the interference issue may be avoided by allocating terrestrial and non-terrestrial operators non-overlapping spectrum, this limits peak rates and lead to inefficient spectrum utilization.

Moreover, satellite and terrestrial operators are owned by different entities that have licensed spectrum dedicated to themselves. There are no commercial mechanisms yet available to enable the satellite and terrestrial operators to coexist without a preexisting cooperation agreement at the same frequency band.

The following aims to address at least one of these issues.

To address at least one of these issues, the following proposes enabling a UE and/or access network node to abstain from transmitting on physical resource blocks (PRBs) associated with a frequency utilized by a satellite while that satellite is determined to have a coverage area at least partly overlapping a coverage area provided by that access network node. The access network node and/or UE may resume transmitting on these PRBs when it is determined that the satellite no longer has a coverage area that at least partly overlaps a coverage area provided by that access network node.

In more detail, the following proposes applying geospatial techniques (e.g., techniques that depend on a relative location of a coverage area provided by a satellite to a coverage area provided by the terrestrial access network node) and frequency correction factors (e.g., to identify frequency shifts caused by a velocity difference between a satellite and the terrestrial access network nodes) to identify radio resources used by an access network node and/or UE that would potentially interfere with the satellite's signalling. Those identified radio resources (e.g., PRBs) may then be blocked for a duration of time that they are determined to be potentially interfering. These resources are later unblocked when interference is determined to no longer be likely.

Such techniques may enable spectrum sharing between terrestrial access network nodes and LEO satellites without necessitating cooperation between the access network nodes and those LEO satellite. This would therefore avoid the interference, and allow the access network node to more efficiently share a frequency spectrum currently reserved for a LEO satellite.

Figure 5:
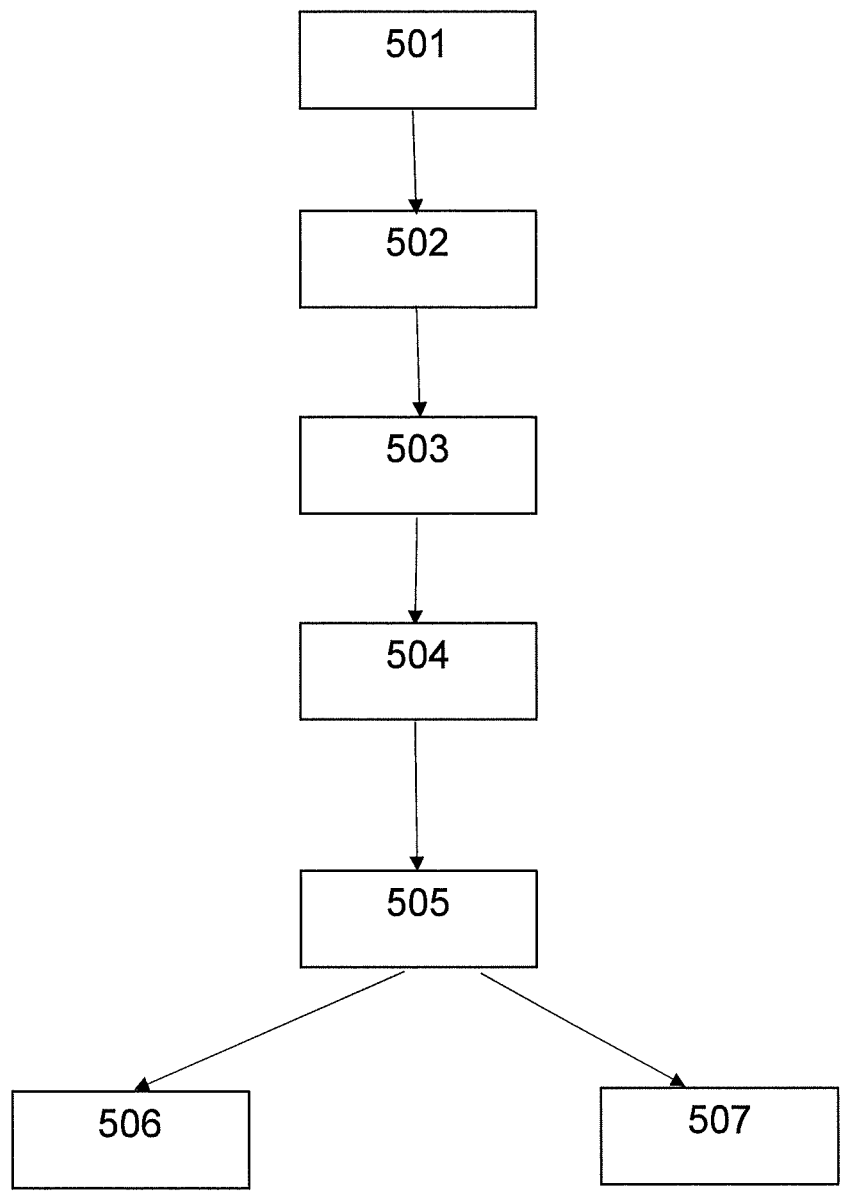
FIG. 5 illustrates example operations.

A flow chart illustrating operations that be performed by an example apparatus is provided in FIG. 5. The example apparatus may comprise an edge server apparatus (e.g., a processing entity located proximal to the access network). In some instances, the edge server apparatus may be located separately from access network apparatus such as a base station, a distributed unit, and/or a centralized unit. In other instances, the edge server apparatus may be located within at least one of a base station, a distributed unit, and/or a centralized unit.

The operations of FIG. 5 may be performed repeatedly. For example, the apparatus may perform the operations of FIG. 5 periodically, and/or in response to a trigger event. As an example, the operations of FIG. 5 may be performed whenever a PRB is about to be fired up (or scheduled). As an example, the operations of FIG. 5 may be performed every time a PRB is about to be fired up (or scheduled).

During 501, satellite information on at least one satellite is obtained. This information may be obtained in any of a plurality of different ways. For example, the satellite information may be obtained from publicly available databases. As another example, the satellite information may be shared by the satellite operator through agreement. It is understood that combinations of these techniques may be used.

The satellite information may relate to a future instance in time. For example, the satellite information may relate to operations of the satellite during a network scheduling occasion, where the scheduling occasion that comprises an initiating time instance and a duration. The satellite information may be considered valid in the time period extending between the initiating time instance and the end of the duration. The satellite information may indicate when and for how long a satellite's signaling may be interfered on by a given PRB.

The information may comprise at least one of: a current satellite information, frequencies of current satellite beams being provided by the satellite, and/or operating frequencies of the satellite.

During 502, the direction of the at least one satellite is determined. For example, the algorithm may determine whether the satellite is approaching the access network node or leaving the access network node.

During 503, the apparatus determines a Doppler shift correction value, f_correction, using the information obtained during 501 and 502. This Doppler shift correction value indicates what the frequencies used by or allocated to the satellite appear to be at the access network node. For example, when the satellite is moving towards the access network node, the frequencies used by the satellite may be measured to be higher at the access network node than at the satellite because they have been frequency shifted upwards as a result of the satellite's approach. Similarly, when the satellite is moving away from the access network node, the frequencies used by the satellite may be measured to be lower at the access network node than at the satellite because they have been frequency shifted upwards as a result of the satellite's approach.

During 504, the apparatus adds (for approaching satellites) or subtracts (for departing satellites) f_correction from each transmission frequency used by the access network node (e.g., for transmission and/or reception) to identify which physical resource blocks (PRBs) are likely to be impact signalling from the satellite if transmission or reception is performed currently in at least one of the uplink and the downlink directions.

During 505, the apparatus determines whether the apparatus intends to schedule traffic in those impacted PRBs identified during 505 in any of the uplink and/or downlink.

When the apparatus determines that at least one impacted PRB was intended for use, the apparatus proceeds to 506.

During 506, the apparatus blanks the at least one impacted PRB so that they are not used.

When the apparatus determines that there were no impacted PRBs scheduled for use, the apparatus proceeds to 507.

During 507, the apparatus unblanks any previously blanked PRBs so that they are used. When there were no previously blanked PRBs, the apparatus uses PRBs corresponding to frequencies that fall within the range of frequencies used by the satellite, plus or minus a maximum Doppler shift correction value (e.g., plus or minus a maximum frequency shift that is attributable to the Doppler shift caused by the satellite and access network node's maximum relative speed difference).

In general, in the present application, the PRBs discussed may correspond to PRBs at frequencies that fall within a range of frequencies used by the satellite, plus or minus a maximum Doppler shift correction value (e.g., plus or minus a maximum frequency shift that is attributable to the Doppler shift caused by the satellite and access network node's maximum relative speed difference).

To help illustrate this mechanism, the following presents an example system model for coexisting cellular and satellite communications that utilizes the presently described techniques, and illustrates several algorithms that may be used for calculating the affected areas, and/or affected signals, and/or affected frequencies.

An example system model comprises two communication subsystems:

1) a sectorized terrestrial cellular system that uses beamforming with $M \geq 1$ transmit antennas and physical resource blocks (PRBs) resources per sector, where a sector may correspond to a coverage area (e.g., cell) provided by an access network node; and 2) a satellite communication system communicating towards the Earth on a carrier, the frequency of which coincides with a PRB of the cellular system.

The downlink system may be modelled in accordance with equations (1) and (2), where:

$$y_k = h_{b,k}^* f_{b,k}^* x_{b,k} + \sum_{s \neq b} h_{s,k}^* f_{s,k}^* x_{s,k} + n_k \quad (1)$$

Where $y_k$ is the received signal on the k-th PRB, $k \in \mathcal{K} := \{1, 2, \ldots, N_{PRB}\}$ $h_{b,k}^*$ is the channel from an access network node, b, (or the interfering satellite, s), $f_{b,k}^*$ is the optimal beamforming vector, which is found through $$f_{b,k}^* := \arg\max_{f \in \mathcal{F}} |h_{b,k}^* f|^2 \quad (2)$$

where f is a pre-defined codebook of beams (e.g., a grid of beams for a total of F beams), such that each beamforming vector $\|f\|^2 = M$, $x_k$ the transmitted signal from the access network node, b, on the k-th PRB or the interfering satellite, s, transmission on a frequency coinciding with the k-th PRB, and $n_k$Norm(0, $\sigma^2$I) independently sampled from a complex Normal distribution. This model holds true regardless of the number of UEs, since a PRB is associated to a UE (or multiple UEs) through scheduling.

The system model on the uplink is analogous to equation (1) where the access network node, b, is replaced with a UE, u (e.g., transmissions of the UE are considered in place of transmissions of the access network node). The satellite, however, continues to transmit on the downlink. In the uplink, the access network node controls which UE transmits on the k-th PRB to the serving access network node using a scheduling request on the physical uplink control channel. The channel reciprocity (e.g., where the uplink channel is assumed to be equal to the downlink channel) is irrelevant in the present example as the focus is on the interference as a statistic.

Nevertheless, in time division duplex (TDD) systems, where exploiting channel reciprocity is possible, the uplink channels may be set equal to $h_k$.

For frequency division duplex (FDD) systems, different channel and beamforming vector notations can be used for the uplink system model, but the underlying principles are similar. Therefore, the presently described examples may apply equally to each of FDD and TDD systems.

The problem of avoiding the uncoordinated interference from the satellite subsystem can be written as an optimization problem, which is a problem of finding a "best" solution from all feasible solution, with the criteria defining "best" being a set of predefined parameters. The objective of such a problem may correspond to a total interference power, and may be represented as below:

$$\text{minimize}: \sum_k \sum_{s \neq b} \mathbb{E}\|h_{s,k}^* f_{b,k}^* x_{s,k}\|^2 \quad (3)$$

$$\text{subject to}: 0 \leq \mathbb{E}\|x_{s,k}\|^2 \leq P_x, \|h_{s,k}\|^2 \geq 1,$$

$$f_{b,k}^* \in \mathcal{F}, k \in \{1, 2, \ldots, \max(\tilde{K})\}$$

where $\tilde{\mathcal{K}} \subseteq \mathcal{K}$ is the subset of PRBs that are utilized at a given traffic load served by the access network node, $P_x$ is the power of the transmitted signal (e.g., the PRB transmit power:=$P_{TX}/N_{PRB}$ for an access network node or the transmit carrier power for the satellite), $h_{s,k}^*$ is the channel from the satellite s, $f_{b,k}^*$ is the optimal beamforming vector defined earlier from a grid of beams $\mathcal{F}$. The first condition constrains the power per resource and the second condition is for the channel gain. This problem is not a convex problem since the optimization set is not a closed set (due to the discrete sets in the constraints). The utilization for a given access network node is the ratio $|\tilde{\mathcal{K}}|/|\mathcal{K}|$.

Satellite carriers over which a signal is transmitted can be mapped to specific PRBs. The conversion from a carrier frequency to a PRB given the operating band and direction are known is straightforward (and so is the conversion from a PRB to a carrier frequency). Currently, in 3GPP networks, this is defined in 3GPP TS 38.104. The equation that converts the k-th PRB to its beginning frequency f(k; B, $N_{PRB}$) is given by:

$$f(k; B, N_{PRB}) = f_{start}^B + \frac{f_{end}^B - f_{start}^B}{N_{PRB}} \cdot (k - 1), \quad (4)$$

where "start" and "end" respectively denote the start and end usable frequencies (i.e., excluding the guard bands) and the PRB range is $k \in \{1, 2, \ldots, N_{PRB}\}$. The equation applies to both uplink and downlink direction. However, a duplex distance $f_{duplex}^{n70}$ may be taken into consideration. This duplex distance refers to a frequency separation between the transmit frequency and the receive frequency.

Since PRBs have a bandwidth of subcarrier spacing $\Delta f$ multiplied by the number of subcarriers per PRB $N_{SC}$, the ending frequency of a given PRB can be found by adding the product of the subcarrier spacing and the number of subcarriers per PRB (e.g., $N_{SC} \Delta f$) to the frequency computed in equation (4).

From the perspective of a satellite equipment, the frequency is corrected due to the rotation velocity of LEO satellites relative to an access network node, which causes a Doppler effect.

For example, for satellite communications with stationary objects, Doppler correction may be useful. A finite quantity f_correction is added to (or subtracted from) the transmitted frequency based on whether the satellite projection is approaching (or departing) the access network node:

$$f_{correction} = \frac{v_s}{c} f_0 \quad (5)$$

where $v_s$ is the satellite speed derived from the altitude, c is the speed of light, and $f_0$ is the transmit sky frequency (e.g., the uncorrected frequency, which may be considered as the frequency that would be measured by an apparatus located in the sky at the satellite's transmitter (e.g., without any Doppler effect)). The corrected frequency at the receiver is thus $f = f_0 \in f_{correction}$.

It is also useful to define a predicted Euclidean distance between the satellite's coverage projection and the sector as:

$$D(t+1; q, v) := \|p_v' - p_q\|,$$

where $P$· is the position vector (as defined later) at time t+1. The "predicted" Euclidean distance may relate to a future time, such as, for example, a next scheduling occasion. Based on a rate of change in the distance between t and t+1, $\Delta D/\Delta t$, it can be determined whether the satellite is approaching the access network node (e.g., the rate of change is negative), or the satellite is moving away from (e.g., departing) the access network node (e.g., the rate of change is positive).

The choice of FDD or TDD transmissions may impact the start and end frequencies in equation (4).

Various modelling techniques may be used for modelling the geometry of cell coverage provided by various access network nodes.

In the present example, the Voronoi tessellation algorithm is used to model the geometry of cellular coverage, which uses a Voronoi diagram. A Voronoi diagram is a partition of a plane into regions close to each of a given set of objects. In the simplest case, these objects are just finitely many points in the plane. For each point, there is a corresponding region, called a Voronoi cell, that comprises all points of the plane closer to that point than to any other point.

Assuming $\mathcal{B}$ to be the set of access network nodes, every access network node in $\mathcal{B}$ has three sectors the set of which is $\mathcal{Q}$. Each sector, b, constructs its own longitude-latitude point $p_b$ for a total of $|\mathcal{Q}|=3|\mathcal{B}|$ points scattered in a two-dimensional geographical area.

The Voronoi tessellation algorithm partitions this two-dimensional plane into Voronoi cells, each of which is $\mathcal{R}_n$ where q is the number of cells and q>0. Since each sector is assigned to one Voronoi cell, $q=|\mathcal{Q}|=3|\mathcal{B}|$.

According to the Voronoi tessellation algorithm, each cell comprises every point in the two-dimensional plane whose Euclidean distance to a given access network node sector is less than or equal to its distance to any other access network node sector. Formally $$\mathcal{R}_b := \{r \in A \mid \|r - p_b\| \le \|r - p_{b'}\|, \forall b \ne b'\} \quad (6)$$

where $\mathcal{A}$ is a metric space corresponding to the two-dimensional geographical area.

Satellite trajectory, and a calculation for determining this, will now be considered.

As mentioned above, satellites, and particularly low Earth orbit (LEO) satellites, may use certain frequencies for satellite communications that interfere with cellular communication. However, since the time-based trajectories of satellites are known to a degree of certainty, computing their coverage projection on to Earth is possible.

Such a computation, when carried out for a given altitude, may be used to determine whether or not interference is likely between transmissions made at terrestrial level and satellite transmissions. For example, this may be determined using a result of overlapping coverage areas of the satellite projections onto the Voronoi cells of the access network nodes.

Assuming there be a non-empty set of satellites $\varepsilon$. The trajectory of a given satellite at a given time instance, t, may be given by the column vector $p^T(t):=[x(t), y(t), \approx(t)]$, which denotes the longitude, latitude, and altitude of the a satellite at the time, t.

The computation for determining any coverage overlap may be simplified by using circular geometry to denote the satellite coverage area, and/or by treating the Earth's surface as a flat surface.

In effect, if the LEO satellite is at an $z(t)=\ell$ from the surface of Earth, and the satellite equipment has an antenna with a beamwidth of θ, then the radius of the projected circular geometry of the satellite coverage can be computed as:

$$R = \frac{1-\cos\theta}{\sin\theta} \cdot \ell \quad (7)$$

This equation may be used to identify a projection region of the v-th satellite $\mathcal{S}_v$, $v \in \varepsilon$ at a given time through a projected center (x', y') and a radius R, using equation (8):

$$S_v := \{p'_v := (x', y') \mid \|r - p'_v\|^2 \le R^2, \forall r \in A\} \quad (8)$$

In this equation, the time instance, t, has been ignored for clarity, and A is the same metric space as defined with respect to equation (6).

At this stage what is left is to compute whether the projection of any given satellite would overlap with the coverage area of any access network node sector.

If this holds true, then interference is possible.

To avoid access network node, the access network node proactively ceases the transmission (or reception) on the k-th downlink (or k-th uplink) PRB of the given sector. This is done for any sector-satellite pair in the area that is determined to have an interfering PRB.

To cease transmission or reception on a given PRB, a PRB blanking algorithm may be performed, where a PRB is technically disabled from transmission or reception. Reversing the blanking (e.g., "unblanking" the PRB) may be performed when it is computed that it is no possibility of interference. Reversing the blanking may be performed only when there is computed to be no possibility of interference. That is, a PRB that has previously been "blanked" (e.g., disregarded for transmission) may be subsequently reused for transmission or reception when it is determined that there is no satellite overlap between that PRB and the serving access network node sector. The unblanking only when zero interference likelihood is calculated may be useful for preventing prevent interference towards the satellite links, as satellite transmission interference may be associated with public safety violations.

Using the above definitions, the operations discussed above in relation to FIG. 5 may be implemented using the loop algorithm discussed below when a plurality of base stations are being considered.

Loop Algorithm Steps:

Pre-compute Voronoi tessellation for all Base Stations $R_q$.
I ← 0
Loop
  Read trajectory for satellite v
  For each v ∈ ε:
    Compute projection region $S_v$
    For each q ∈ Q:
      $O_q \leftarrow O(R_q, S_v)$
      if $O_q = 1$, then:
        Compute D(I +1; q, v) and find whether satellite v will be approaching or departing q;
        Correct frequencies used by sector q (both uplink and downlink) due to Doppler as perceived by satellite v using $f_{correction} = (v_s * f_0)/c$
        Convert corrected frequencies to PRB(s) using $f(k; B, N_{PRB})$

```
If PRB(s) blankable, then
    Proactively blank PRBs corresponding to frequency and
    direction
Else
    Unblock PRBs on q
I ← I +1
```

In this loop algorithm example, the apparatus receives, as an input, the coordinates of a plurality of base stations, the frequencies used by those plurality of base stations, and/or any sectorization of the transmissions and/or reception of those base stations. The input may comprise frequencies of at least one LEO satellite as a function of time. For example, the frequencies of the at least one LEO satellite may be represented by one or more time varying functions.

The loop algorithm example outputs a time varying sequence that indicates, for a plurality of time instances and/or time durations, a respective PRB configuration, where the PRB configuration indicates which PRB resources are to be blanked (e.g., not used) and which PRB resources are to be unblanked (e.g., used).

This computation of the loop algorithm example may comprise, for each satellite, v:
  determining a terrestrial coverage region provided by the satellite at a particular time instance or during a particular time duration (a terrestrial coverage region may comprise a planar coverage region at ground level);
  determining any intersection (e.g., overlap) between the terrestrial coverage region of the satellite and a coverage area of at least one cell (and/or sector) provided by an access network node);
  When there is no intersection, the output indicates that any PRB may be used (e.g., all PRB resources may be unblanked); and/or.
  When there is an intersection: a Doppler shift value for correcting frequencies is determined (which includes whether the satellite v will be approaching or leaving the access network node); corrected satellite frequencies will be obtained by applying the Doppler shift value to frequencies that will be used by the satellite; corresponding PRBs to those corrected satellite frequencies are found; and the output indicates that those corresponding PRBs are to be blanked.

In order to compute whether an overlap between coverage areas of a cell provided by an access network node and a coverage area provided by a satellite, the intersection of the metric spaces corresponding to the q-th access network node sector and the v-th satellite may be determined using equation (9):

$$O(\mathcal{R}_q, S_v) := \mathbb{1}[\mathcal{R}_q \cap S_v \neq \emptyset] \quad (9)$$

Where $R_q$ represents a planar coverage of the access network node, and $S_v$—represents a planar coverage area of the satellite. Equation (9) is equal to zero when there is no overlap between the coverage areas of the two coverage areas.

Since the run-time complexity of Voronoi tessellation for q cells is in O(g log g), the run-time complexity of the algorithm is in $O(q \log q + q|\mathcal{E}|)$ which is polynomial time in q. This holds true as long as the sectorization of the access network nodes continuously change (e.g., by means of automated antenna azimuth optimization). However, if sectorization is static, then the Voronoi computation step in the algorithm is run only once bringing the run-time complexity to $\mathcal{O}(q|\mathcal{E}|)$ in subsequent runs.

Using the above system model, FIGS. 6 and 7 and the below discussion illustrate a potential impact on the presently described network configuration, including advantageous effects.

Figure 6:
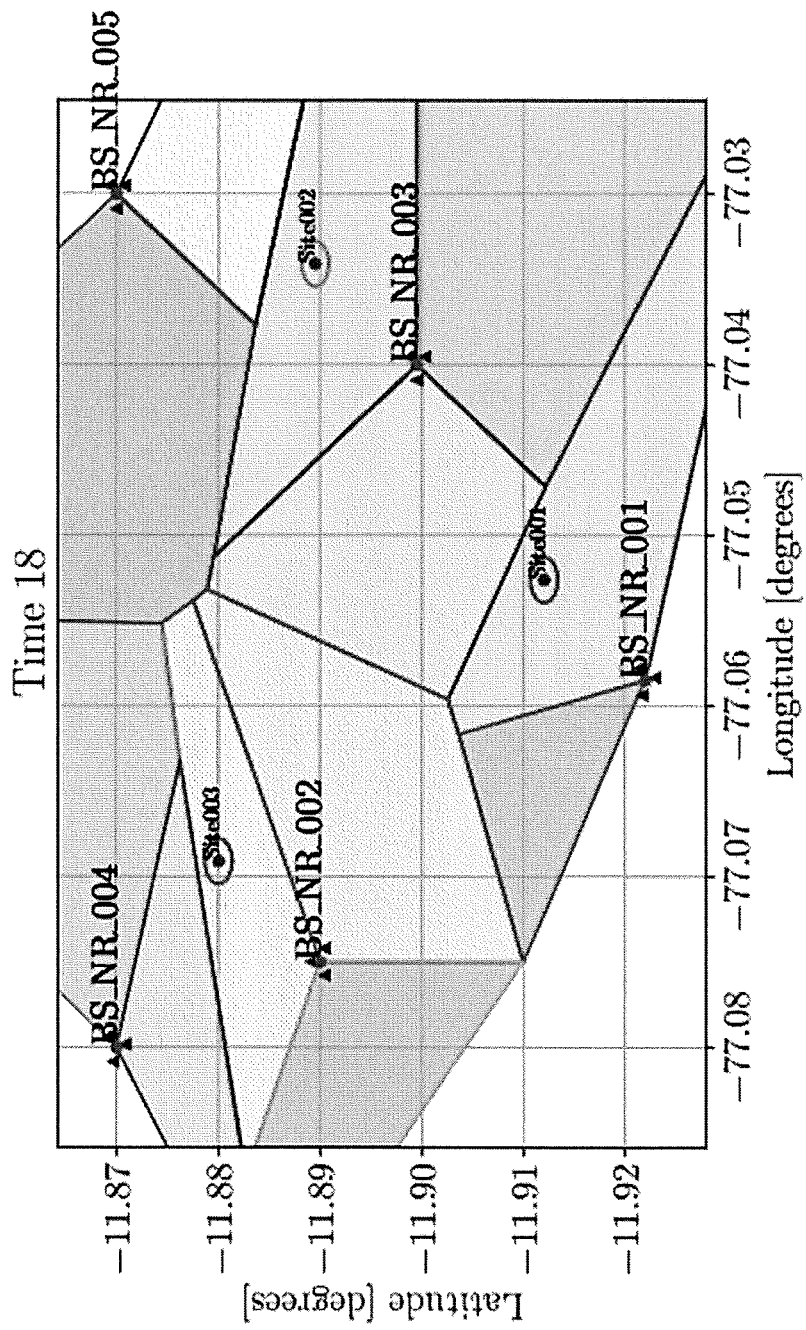
FIG. 6 illustrates an example access network configuration.
Figure 7:
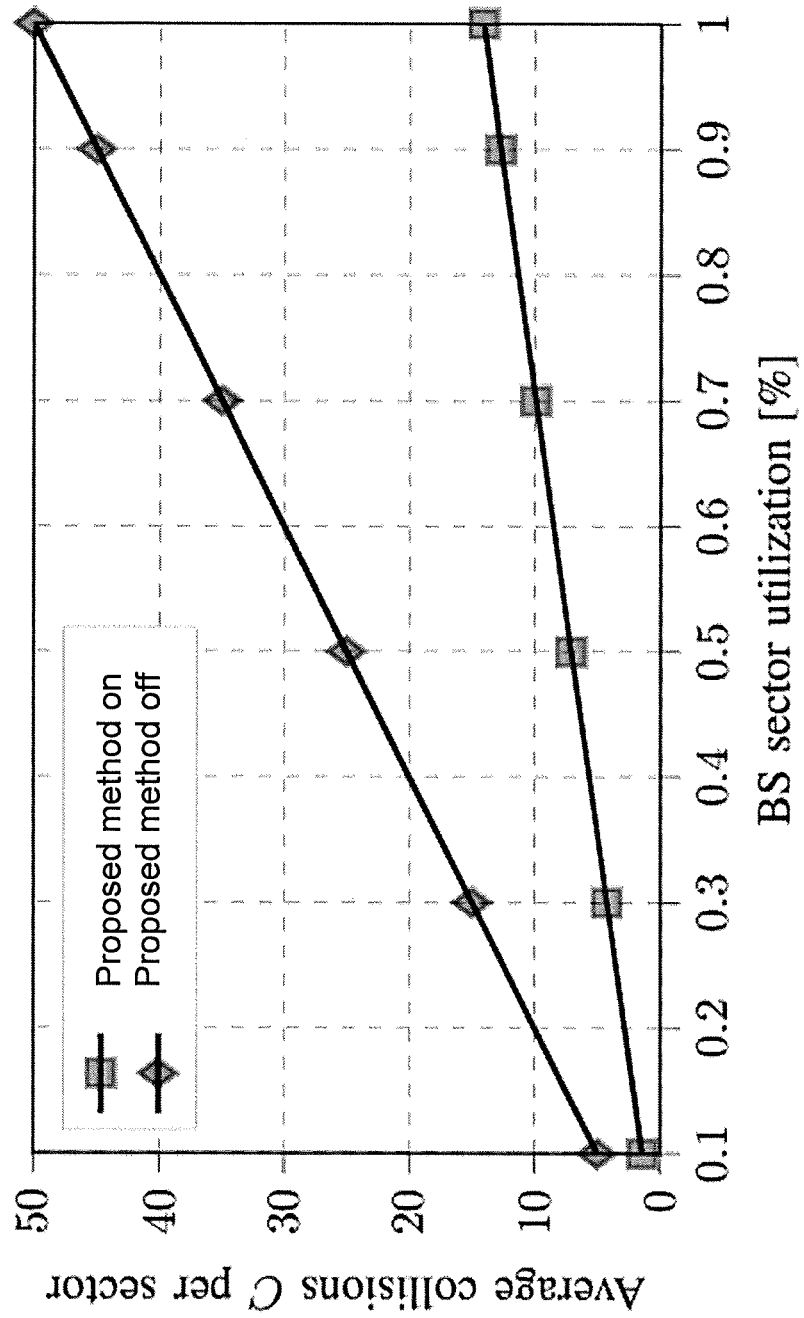
FIG. 7 illustrates example interference.

FIGS. 6 and 7 illustrate results that may be obtained in a realistic geographical rural area that is covered by five access network node sites (e.g., 5 macro access network node sites). Each access network node in the present example comprises three sectors, with an inter-site distance range of 3.90 km to 5.21 km. The parameters are outlined in Table 1.

TABLE 1

Simulation settings

| Parameter | Value |
| --- | --- |
| Frequency band | C band |
| Satellite beamwidth | 60° |
| Carrier frequency | 4 GHz |
| Number of PRBs, $N_{PRB}$ | 50 |
| access network node sector utilization | {10, 30, 50, 70, 90}% |
| LEO satellite Earth speed | 5,600 m/s |

Three LEO satellites pass over this rural area during a specific time duration. PRBs are scheduled for transmission on the uplink and/or downlink between the access network nodes and UEs within coverage areas/sectors provided by those access network nodes independently. The PRBs may be scheduled for transmission based on sector utilization. A plurality of UEs are assumed to be scattered uniformly across the service areas of each sector. To ensure utilization, a full-buffer traffic model in both the uplink and/or downlink directions is assumed. For example, it is assumed that all sectors (e.g., cells and/or coverage areas of the access network node(s)) will have traffic to signal continuously.

To measure the performance of the algorithm, a "collision" event is defined as occurring at a moment when:
  1) an overlap of a satellite projection onto a Voronoi cell (or union of cells thereof) of an access network node sector (or several sectors thereof), as defined in (9); and
  2) More than one transmission takes place simultaneously within the frequency band of one PRB (e.g., due to a transmission from an access network node (or UE) that coincides with the corrected sky frequency (i.e., from a satellite).

A collision event may be considered to be an indication of uncoordinated interference. If the Doppler corrected frequency as transmitted by the satellite v is denoted as $f_{corrected}^{(v)}$ (as computed in equation (5)), then the number of collisions across the network may be calculated using:

$$C(\mathcal{B}, \mathcal{E}) = \sum_{q \in \mathcal{B}, v \in \mathcal{E}} \sum_k O(\mathcal{R}_q, S_v) \cdot \mathbb{1}[f(k^{(q)}; B^{(q)}, N_{PRB}^{(q)}) = f_{corrected}^{(v)}]. \quad (10)$$

Minimizing the objective in equation (3) implies minimizing collisions per direction (e.g., uplink and/or downlink) since they are the only source of interference being considered in this system model. This is because no access network node pair or UE pair can transmit using the same PRB at the same time and space. This coordination between access network node pairs and UE pairs is currently specified and handled within NR itself. This coordination may be performed vis, for example, control channel signalling (see, for example, TS 3GU.S. Plant Pat. No. 38,300).

To establish a baseline for benchmarking purposes, a simulation is run with and without use of the proposed PRB blanking.

In this scenario, FIG. 6 illustrates the setup of the proposed geographical area being considered, at a particular time instance t. As can be seen in FIG. 6, each sector of the three-sectored access network nodes generates a respective Voronoi cell. Such a Voronoi cell is the natural service area of the associated access network node sector, where UEs are uniformly scattered and LEO satellites can pass over.

FIG. 7 illustrates the result of the simulation. FIG. 7 illustrates a time average collisions as a function of the access network node sector utilization for two algorithms: EPA and our the presently proposed PRB blanking mechanism.

As can be seen in FIG. 7, for both algorithms, as the utilization of the access network node sectors increase (or as $\overset{\frown}{K}$ gets closer to $\overset{\frown}{K}$ on all sectors), so does the average number of collisions, C'. This is true for both uplink and downlink transmissions. However, the rate at which the average number of collision increases is different for the two algorithms. In particular, there is a lower average number of collisions per sector for the proposed technique relative to the baseline case.

Further, FIG. 7 illustrates that the proposed technique is associated with a smaller gradient than the baseline case, which results in increasing disparity between the two techniques with increasing access network node sector utilization. This may be related to the fact that, at the assumed/modelled full buffer, all allocated PRBs are used in transferring data. For EPA, this means that once a satellite passes, all allocated PRBs cause collisions. However, for the proposed PRB blanking mechanism, PRBs are proactively blanked, which minimizes the instantaneous collisions, which brings down the overall average.

Although the results for the proposed PRB-blanking mechanism show a non-zero collision, this may be explained as follow: The present modelling relates to scenario where a group of UEs are served by an access network node sector, the realistic coverage boundaries of which do not coincide with the modelled Voronoi cells boundaries. This may result from non-uniformity in propagation losses that impact the selection of the serving sector based on non-distance measures (e.g., signal strength or quality). Consequently, the blanked PRB may not have been the optimal one to blank, which may result in a collision.

Figure 8:
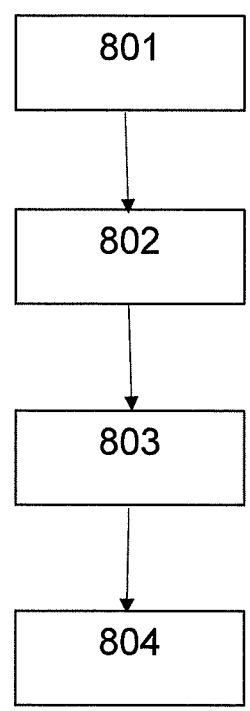
FIG. 8 illustrates example operations that may be performed by an apparatus described herein.

FIG. 8 illustrates operations that may be performed by an apparatus implementing at least part of the above-mentioned mechanisms. It is therefore understood that the above examples may find correspondence in features mentioned below. The time at which the operations of FIG. 8 are performed may be as discussed above. For example, the operations of FIG. 8 may be performed periodically and/or in response to a trigger event being detected. The operations of FIG. 8 may be performed in advance of a next scheduling occasion, as described above.

During 801, the apparatus determines that a first satellite coverage area provided by a satellite will at least partially overlap with a first access coverage area provided by a terrestrial access network node at and/or during a first time.

Whether the first satellite coverage area will at least partly overlap with the first access coverage area at and/or during a first time may be determined in any of a plurality of different ways.

In its most simple form, the first satellite coverage area and the first access coverage area may be determined to be at least partly overlapping when the satellite is a predetermined distance (or less than the predetermined distance) away from the terrestrial access node. This predetermined distance may be the same for any terrestrial access node. This predetermined distance may be set for the terrestrial access node in dependence on a distance of coverage provided by the first access coverage area (e.g., based on the furthest distance from the terrestrial access node that falls within the first access coverage area).

In another example, the first satellite coverage area and the first access coverage area may be determined to be at least partly overlapping by using the above-mentioned Voronoi cell tessellation mechanism.

In another example, the first satellite coverage area and the first access coverage area may be determined to be at least partly overlapping by considering additional properties of the signalling performed by the satellite and the terrestrial access node (such as, for example, beam directivity and/or power of transmission). This latter mechanism may obtain higher spectrum sharing efficiency relative to the previous mechanisms, but at a cost of higher processing for determining when the overlap is likely to occur.

During 802, the apparatus determines a first Doppler shift correction value, the first Doppler shift correction value corresponding to a frequency shift resulting from a relative velocity difference between the satellite and the terrestrial access network node at and/or during the first time.

During 803, the apparatus determines at least one first shifted satellite frequency by correcting at least one transmission and/or reception frequency of the satellite using the first Doppler shift correction value.

During 804, the apparatus causes the terrestrial access network node to abstain from transmitting and/or receiving signalling on resources corresponding to the at least one first shifted satellite frequency.

The apparatus may be comprised in at least one of: the terrestrial access network node, another terrestrial access network node, the satellite, a user equipment, or a server. The apparatus may comprise an edge processing apparatus (e.g., an edge server, as described above).

The satellite may be a non-geostationary satellite. The satellite may be a low Earth orbit satellite. As mentioned above, references in the present application to a satellite may refer more generally to a non-terrestrial apparatus. Therefore, the "satellite" mentioned in respect of FIG. 8 may be a non-terrestrial apparatus (e.g., a high altitude platform system). The non-terrestrial apparatus may comprise any non-terrestrial apparatus having a defined trajectory relative to the terrestrial access network node. As mentioned above, the non-terrestrial apparatus may be located at least 20 km above the terrestrial access network node. The non-terrestrial apparatus may be located in outer space. The non-terrestrial apparatus may be located in an orbit around a planet (e.g., the Earth) that comprises the terrestrial access network node.

The resources may comprise time and/or frequency resource elements (and/or collections thereof). For example, the resources may comprise at least one physical resource block.

The causing may comprise causing the terrestrial access network node to abstain from receiving said signalling by causing a user equipment located within the first access coverage area to abstain from transmitting at the at least one first shifted satellite frequency. For example, this may be caused by the apparatus causing the user equipment to be signalled by the terrestrial access network node to perform said abstaining.

The causing may comprises causing the terrestrial access network node to abstain from transmitting signalling on resources corresponding to the at least one first shifted satellite frequency. For example, this may be caused by the apparatus causing the terrestrial access network node to be signalled to perform said abstaining.

The apparatus may update the Doppler shift correction value for use at a later time. For example, the apparatus may: determine that a second satellite coverage area provided by the satellite will at least partially overlap with a second access coverage area provided by the terrestrial access network node at and/or during a second time, determine a second Doppler shift correction value, the second Doppler shift correction value corresponding to a frequency shift resulting from a relative velocity difference between the satellite and the terrestrial access network node at and/or during the second time, determine at least one second shifted satellite frequency by correcting at least one transmission and/or reception frequency of the satellite using the second Doppler shift correction value, and cause the terrestrial access network node to abstain from transmitting and/or receiving signalling on resources corresponding to the at least one second shifted satellite frequency.

The first time and the second time may refer to time instances and/or time durations that at least partially do not overlap (e.g., the first and second time may comprise non-overlapping time instances).

The second satellite coverage area may be the same as the first satellite coverage area. The second satellite coverage area may comprise at least one region that does not overlap with the first satellite coverage region. This may be, for example, as a result of the satellite moving relative to the access network node.

The first and second access coverage areas may be the same. The second access coverage area may comprise at least one region that does not overlap with the first access coverage area. This may be, for example, as a result of a transmission property (e.g., transmission power) of the access network node changing.

The second Doppler shift value may be different in magnitude and/or direction relative to the first Doppler shift value. The first and second Doppler shift values may be determined at the same time (e.g., as part of the same computation). The first and second Doppler shift values may be determined at different times (e.g., as part of different computations).

The at least one first shifted satellite frequency may be different to the at least one first shifted satellite frequency. In such a case, the apparatus may, at or during the second time, cause the terrestrial access network node to transmit and/or receive signalling on resources corresponding to the at least one first shifted satellite frequency. For example, the at least one first shifted satellite frequency may be "unblanked".

The apparatus may determine when there is likely to no longer be any overlapping coverage areas between the coverage provided by the satellite and the access network node and cause resources to become "unblanked". For example, the apparatus may determine that a third satellite coverage area provided by the satellite will not at least partially overlap with a third access coverage area provided by the terrestrial access network node at and/or during a third time, and cause the terrestrial access network node to transmit and/or receive signalling on resources corresponding to the at least one second shifted satellite frequency and/or first shifted satellite frequency. For example, there may be no overlap in the third satellite coverage area and the third access coverage area.

The apparatus may obtain at least one of: a current location of the satellite, a trajectory of the satellite, a speed and/or velocity of the satellite, or the transmission and/or reception frequency of the satellite. This information may be used when determining the first satellite coverage area and/or the first Doppler shift correction value. This information may be obtained from, for example, a publicly available database (although it is understood that this is not limiting).

The foregoing description has provided by way of non-limiting examples a full and informative description of some examples. However, various modifications and adaptations may become apparent to those skilled in the relevant arts in view of the foregoing description, when read in conjunction with the accompanying drawings and the claims. However, all such and similar modifications of the teachings will still fall within the scope of the claims.

In the above, different examples are described using, as an example of an access architecture to which the described techniques may be applied, a radio access architecture based on long term evolution advanced (LTE Advanced, LTE-A) or new radio (NR, 5G), without restricting the examples to such an architecture, however. The examples may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

As provided herein, various aspects are described in the detailed description of examples and in the claims. In general, some examples may be implemented in hardware or special purpose circuits, software code, logic or any combination thereof. For example, some aspects may be implemented in hardware, while other aspects may be implemented in firmware or software code which may be executed by a controller, microprocessor or other computing device, although examples are not limited thereto. While various examples may be illustrated and described as block diagrams, flow charts, or using some other pictorial representation, it is well understood that these blocks, apparatus, systems, techniques or methods described herein may be implemented in, as non-limiting examples, hardware, software code, firmware code, special purpose circuits or logic, general purpose hardware or controller or other computing devices, or some combination thereof.

The examples may be implemented by computer software code stored in a memory and executable by at least one data processor of the involved entities or by hardware, or by a combination of software code and hardware.

The memory referred to herein may be of any type suitable to the local technical environment and may be implemented using any suitable data storage technology, such as semiconductor based memory devices, magnetic memory devices and systems, optical memory devices and systems, fixed memory and removable memory.

The (data) processors referred to herein may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Further in this regard it should be noted that any procedures, e.g., as in FIG. 8, and/or otherwise described previously, may represent operations of a computer program being deployed by at least one processor comprised in an apparatus (where a computer program comprises instructions for causing an apparatus to perform at least one action, the instructions being represented as software code stored on at least one memory), or interconnected logic circuits, blocks and functions, or a combination of operations of a computer program being deployed by at least one processor comprised in an apparatus and logic circuits, blocks and functions. The software code may be stored on memory, such as physical media as memory chips, or memory blocks implemented within the processor, magnetic media (such as hard disk or floppy disks), and optical media (such as for example DVD and the data variants thereof, CD, and so forth).

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multicore processor architecture, as nonlimiting examples.

Additionally or alternatively, some examples may be implemented using circuitry. The circuitry may be configured to perform one or more of the functions and/or method steps previously described. That circuitry may be provided in the base station and/or in the communications device and/or in a core network entity.

As used in this application, the term "circuitry" or "means" may refer to one or more or all of the following:
  (a) hardware-only circuit implementations (such as implementations in only analogue and/or digital circuitry);
  (b) combinations of hardware circuits and software cade, such as:
    (i) a combination of analogue and/or digital hardware circuit(s) with software/firmware code and
    (ii) any portions of hardware processor(s) with software code (including digital signal processor(s)), software code, and memory (ies) that work together to cause an apparatus, such as the communications device or base station to perform the various functions previously described; and
  (c) hardware circuit(s) and or processor(s), such as a microprocessor(s) or a portion of a microprocessor(s), that requires software code (e.g., firmware) for operation, but the software code may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware code. The term circuitry also covers, for example integrated device.

Implementations of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

The term "non-transitory," as used herein, is a limitation of the medium itself (i.e., tangible, not a signal) as opposed to a limitation on data storage persistency (e.g., RAM vs. ROM).

The scope of protection sought for various examples of the disclosure is set out by the independent claims. The examples and features, if any, described in this specification that do not fall under the scope of the independent claims are to be interpreted as examples useful for understanding the disclosure.

The foregoing description has provided by way of non-limiting examples a full and informative description of example implementations of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further implementation comprising a combination of one or more implementations with any of the other implementations previously discussed.

The invention claimed is:

1. An apparatus comprising:
   at least one processor; and
   at least one memory storing instructions that, when executed with the at least one processor; cause the apparatus to perform:
     determining that a first non-terrestrial apparatus coverage area provided with a non-terrestrial apparatus will at least partially overlap with a first access coverage area provided with a terrestrial access network node at least one of at or during a first future time;
     determining a first Doppler shift correction value, the first Doppler shift correction value corresponding to a frequency shift resulting from a relative velocity difference between the non-terrestrial apparatus and the terrestrial access network node at least one of at or during the first future time;
     determining at least one first shifted non-terrestrial apparatus frequency with correcting at least one of at least one transmission or reception frequency of the non-terrestrial apparatus using the first Doppler shift correction value;
     determining that a second non-terrestrial apparatus coverage area provided with the non-terrestrial apparatus will at least partially overlap with a second access coverage area provided with the terrestrial access network node at least one of at or during a second time;
     determining a second Doppler shift correction value, the second Doppler shift correction value corresponding to a frequency shift resulting from a relative velocity difference between the non-terrestrial apparatus and the terrestrial access network node at least one of at or during the second time determining at least one second shifted non-terrestrial apparatus frequency with correcting at least one of at least one transmission or reception frequency of the non-terrestrial apparatus using the second Doppler shift correction value;

based on the determined overlaps and the first and second Doppler shift correction values, performing a physical resource block blanking to prevent transmission or reception on impacted physical resource blocks from being scheduled by blanking physical resources corresponding to the frequencies that fall within a range of frequencies of the first and second shifted non-terrestrial apparatus frequencies, and unblanking for use any previously blanked physical resource after the second time, and when there are no previously blanked resources, using resources corresponding to frequencies that fall within a range of frequencies of the first and second shifted non-terrestrial apparatus frequencies.

2. An apparatus as claimed in claim 1, wherein said range of frequencies of the at least one first shifted non-terrestrial apparatus frequency is one of plus or minus a maximum Doppler shift correction value and a maximum frequency shift that is attributable to the Doppler shift.

3. An apparatus as claimed in claim 1, wherein the instructions, when executed with the at least one processor, cause the terrestrial access network node to abstain from transmitting signalling on resources corresponding to the at least one first shifted non-terrestrial apparatus frequency.

4. An apparatus as claimed in claim 1, wherein the at least one first shifted non-terrestrial apparatus frequency is different to the at least one first shifted non-terrestrial apparatus frequency, and wherein the instructions, when executed with the at least one processor, at or during the second time, cause the terrestrial access network node to at least one of transmit or receive signalling on resources corresponding to the at least one first shifted non-terrestrial apparatus frequency.

5. An apparatus as claimed in claim 1, wherein the instructions, when executed with the at least one processor, further cause the apparatus to perform:

determining that a third non-terrestrial apparatus coverage area provided with the non-terrestrial apparatus will not at least partially overlap with a third access coverage area provided with the terrestrial access network node at least one of at or during a third time; and blanking physical resource blocks of resources corresponding to the at least one first shifted non-terrestrial apparatus frequency for causing the terrestrial access network node and a user equipment located within the first access coverage area to at least one of transmit or receive signalling on resources corresponding to the at least one second shifted non-terrestrial apparatus frequency.

6. An apparatus as claimed in claim 1, wherein the instructions, when executed with the at least one processor, further cause the apparatus to perform obtaining at least one of: a current location of the non-terrestrial apparatus, a trajectory of the non-terrestrial apparatus, at least one of a speed or velocity of the non-terrestrial apparatus, or at least one of the transmission or reception frequency of the non-terrestrial apparatus.

7. An apparatus as claimed in claim 6, wherein the instructions, when executed with the at least one processor, further cause the apparatus to perform obtaining from a publicly available database.

8. An apparatus as claimed in claim 1, wherein the apparatus is at least one of: the terrestrial access network node, another terrestrial access network node, the non-terrestrial apparatus, the user equipment, or a server.

9. An apparatus as claimed in claim 1, wherein the non-terrestrial apparatus is a non-geostationary satellite.

10. An apparatus as claimed in claim 9, wherein the non-terrestrial apparatus is a low earth orbit satellite.

11. A method for an apparatus, the method comprising:

determining that a first satellite coverage area provided with a satellite will at least partially overlap with a first access coverage area provided with a terrestrial access network node at least one of at or during a first future time;

determining a first Doppler shift correction value, the first Doppler shift correction value corresponding to a frequency shift resulting from a relative velocity difference between the satellite and the terrestrial access network node at least one of at or during the first future time;

determining at least one first shifted satellite frequency with correcting at least one of at least one transmission or reception frequency of the satellite using the first Doppler shift correction value;

determining that a second satellite coverage area provided by the satellite will at least partially overlap with a second access coverage area provided by the terrestrial access network node at least one of at or during a second time;

determining a second Doppler shift correction value, the second Doppler shift correction value corresponding to a frequency shift resulting from a relative velocity difference between the satellite and the terrestrial access network node at least one of at or during the second time;

determining at least one second shifted non-terrestrial apparatus frequency by correcting at least one of at least one transmission or reception frequency of the satellite using the second Doppler shift correction value;

based on the determined overlaps and first and second Doppler shift correction values, performing a physical resource block blanking to prevent transmission or reception on impacted physical resource blocks from being scheduled by blanking physical resources corresponding to the frequencies that fall within a range of frequencies of the first and second shifted non-terrestrial apparatus frequencies, and unblanking for use any previously blanked physical resource after the second time, and when there are no previously blanked resources, using resources corresponding to frequencies that fall within a range of frequencies of the first and second shifted non-terrestrial apparatus frequency.

12. A computer program comprising instructions which, when executed with an apparatus, causes the apparatus to perform:

determining that a first satellite coverage area provided with a satellite will at least partially overlap with a first access coverage area provided with a terrestrial access network node at least one of at or during a first future time;

determining a first Doppler shift correction value, the first Doppler shift correction value corresponding to a frequency shift resulting from a relative velocity difference between the satellite and the terrestrial access network node at least one of at or during the first future time;

determining at least one first shifted satellite frequency with correcting at least one of at least one transmission or reception frequency of the satellite using the first Doppler shift correction value;

determining that a second satellite coverage area provided by the satellite will at least partially overlap with a second access coverage area provided by the terrestrial access network node at least one of at or during a second time;

determining a second Doppler shift correction value, the second Doppler shift correction value corresponding to a frequency shift resulting from a relative velocity difference between the satellite and the terrestrial access network node at least one of at or during the second time;

determining at least one second shifted non-terrestrial apparatus frequency by correcting at least one of at least one transmission or reception frequency of the satellite using the second Doppler shift correction value;

based on the determined overlaps and first and second Doppler shift correction values, performing a physical resource block blanking to prevent transmission or reception on impacted physical resource blocks from being scheduled by blanking physical resources corresponding to the frequencies that fall within a range of frequencies of the first and second shifted non-terrestrial apparatus frequencies, and unblanking for use any previously blanked physical resource after the second time, and when there are no previously blanked resources, using resources corresponding to frequencies that fall within a range of frequencies of the first and second shifted non-terrestrial apparatus frequency.

* * * * *